R. J. TRAUPMANN.
AUTOMOBILE BUMPER.
APPLICATION FILED FEB. 19, 1919.

1,338,048.

Patented Apr. 27, 1920.

Witnesses
H. W. Chase
C. L. Waal

Inventor
Raymond J. Traupmann
By R. S. Caldwell
Attorney

UNITED STATES PATENT OFFICE.

RAYMOND J. TRAUPMANN, OF MILWAUKEE, WISCONSIN, ASSIGNOR TO MILWAUKEE AUTO ENGINE & SUPPLY COMPANY, OF MILWAUKEE, WISCONSIN, A CORPORATION OF WISCONSIN.

AUTOMOBILE-BUMPER.

1,338,048.　　　　　　　Specification of Letters Patent.　　Patented Apr. 27, 1920.

Application filed February 19, 1919. Serial No. 277,924.

*To all whom it may concern:*

Be it known that I, RAYMOND J. TRAUPMANN, a citizen of the United States, and resident of Milwaukee, in the county of Milwaukee and State of Wisconsin, have invented new and useful Improvements in Automobile-Bumpers, of which the following is a description, reference being had to the accompanying drawings, which are a part of this specification.

The invention relates to automobile bumpers and to the novel supporting arms and attaching devices and the combination of such parts and the bumper bar.

One of the objects of the invention is to provide attaching arms of spring metal which will effectually resist the forces transmitted to them when the bumper bar is struck.

A further object of the invention is to provide an attaching device or supporting arm clamp to secure the arms to the side bars of the automobile in such a way as to permit of ready attachment of the bumper to those types of cars provided with mud aprons disposed between the forward portions of the side bars.

A further object of the invention is to provide an attaching device in which an attaching hook is held in firm engagement with the upper or lower flange of the channel side bar by coöperation with a wedge member and a part of the supporting arm or other plate abutting against the outer side of a portion of the web of the side bar.

The invention further consists in the several features hereinafter set forth and more particularly defined by claims at the conclusion hereof.

In the drawings, showing one embodiment of the invention:

Figure 1:
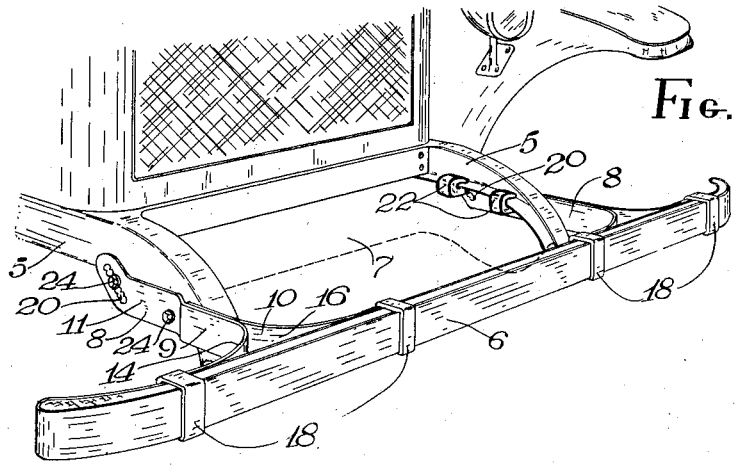
Figure 1 is a perspective view of the bumper applied to the front end of a motor vehicle with the mud apron shown in dotted lines.
Figures 2, 3:
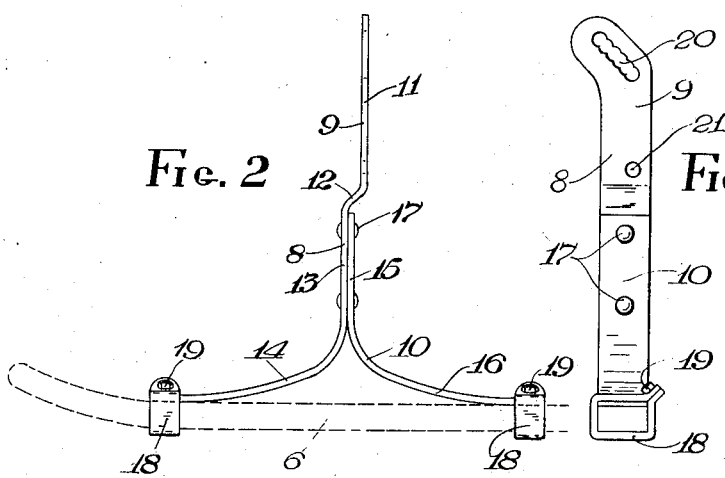
Fig. 2 is a detail plan view of one of the attaching arms with a portion of the bumper bar shown in dotted lines.
Fig. 3 is a side view of one of the arms.
Figure 4:
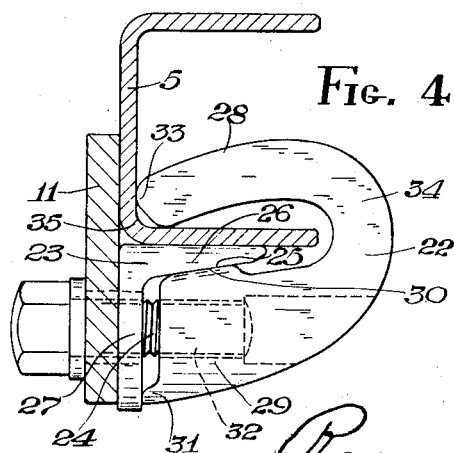
Fig. 4 is an end view of one of the attaching devices, showing its manner of attachment to the side bar and supporting arm.

The numeral 5 designates the usual channel side bars of a motor vehicle, 6 the bumper bar and 7 the mud apron, shown in dotted lines, which is usually attached to either the top or bottom flanges of the side bars. The bumper is adapted to be attached to the side bars adjacent the apron though it may be used where aprons are not employed and also at the rear end of the vehicle.

The supporting arms 8 consist in each instance of flat metal members 9 and 10 of spring steel or other resilient metal of less thickness than depth. The member 9 has a straight side bar-abutting portion 11, an offset portion 12, a straight portion 13 and an outwardly bowed end 14. The member 10 has a straight portion 15 and an outwardly bowed end 16. The members 9 and 10 are secured together at their straight portions 13 and 15 in any suitable manner as by rivets 17 and their ends 14 and 16 diverge from each other and are adjustably secured to the bumper bar by split collars 18 surrounding the bar and clamped thereto by bolts 19. The rear end of the portion 11 of the member 9 has a slot 20 inclined with respect to the vertical to facilitate adjusting the arms to the desired inclination with respect to the curvature of the forward portions of the side bars. A bolt hole 21 is also provided in the forward part of the portion 11.

The attaching device, of which there are two for each supporting arm, consists of a hook member 22, a wedge member 23 and a clamping bolt 24.

The wedge member 23 consists of an angled or L-shaped block having an inclined wedge face 25 on one leg 26 and an aperture in the other leg 27 through which the bolt 24 loosely passes. The outer side of the leg 26 abuts against one of the flanges of the side bar and is here shown as abutting against the lower flange while the outer face of the leg 27 abuts against the straight portion 11 of the supporting arm.

The hook member 22 consists of a hook 28 having a shank 29 provided with a wedge face 30 and a fulcrum or canting edge 31 on the side opposite to the face 30. The bolt 24 passes through a threaded aperture 32 in the shank 29. In this connection it may be noted that instead of the headed bolt, the bolt may be formed integral with the hook and a nut used on the outer end against the supporting arm. The end 33 of the hook is designed to engage one of the flanges and the web portion of the side bar near their point of jointure and opposite the leg 26 of the member 23 while the bend 34 of the hook preferably clears the flange adjacent thereto so as to relieve the outer portion of said flange of strain.

With this construction each of the supporting arms is attached to the adjacent side bar by the bolts 24 together with the clamping members above described, one of the bolts passing loosely through the hole 21 and the other through the slot 20, the position of the arm being adjusted by swinging it about the forward bolt to the desired position and then tightening up this bolt and that in the slot 20. In each instance a tightening up of the bolt with the members 22 and 23 mounted thereon will cause the hook member to be moved inwardly. Under these conditions the shank 29 wedges itself against the member 23 and the leg 26 of this member is moved upwardly against the flange of the side bar during a canting of the hook fulcrum 31 so that the flange of the side bar is clamped between said member 22 and the end 33 of the hook 28 and at the same time the web of the side bar is clamped between a part of the supporting arm and the hook 28 and said arm also abuts against the extended bearing surface formed by the leg 27 with the result that the supporting arm is firmly clamped to the side bar. The wedging of the member 23 into place to form a continuation of the side bar effectually forms a T-shaped frame against the top of which the flat side of the supporting arm is securely clamped by forces exerted at the web of the T. Furthermore the engagement of the leg 26 of the member 23 for a considerable distance on the flange materially strengthens this flange against bending.

In the above construction should the bumper bar be struck a blow tending to push the vehicle sidewise, the lateral thrust would be resisted by the bowed ends of the supporting arms and any tendency to wrench the arm from its side bar would be resisted by the clamping engagement effected by the arm and the hook against the web of the side bar. Should the bumper be struck head on, the bowed ends will be sprung back and the force of impact, not taken care of by the resiliency of the bar and the arms, will be transmitted rearwardly against the bolts 24 and the attaching devices which, due to the clamping engagement on the outer and inner sides of the web and lower flanges of the side bar will transmit this shock to the said side bars longitudinally of their length. Similarly, if the bumper bar is struck from above or below, the tight clamping engagement between the attaching devices and the lower flange of the side bars will come into play to maintain said arms in position on the forward end of the automobile.

The invention, being capable of expression in other forms than that described, it is not to be limited to the details of construction herein shown since what is claimed as new and what is desired to be secured by Letters Patent is set forth in the appended claims.

What I claim as new and desire to secure by Letters Patent is:

1. In an automobile bumper attaching device for securing the bumper to the flanged side bars of an automobile, a plurality of clamps, each including a hooked member and a wedge member coöperating therewith to clamp one of the flanges of the side bars between said hooked member and wedge member.

2. In an automobile bumper, the combination, with bumper supporting means, of securing devices for said means comprising a plurality of clamps, each including a hooked member and a wedge member coöperating therewith to clampingly engage one of the flanges of the side bar and coöperating with said supporting means to clampingly engage the web of the side bar.

3. In an automobile bumper attaching device for securing the bumper to the flanged side bars of an automobile, a plurality of clamps, each comprising a hooked member, a wedge member coöperating therewith to clamp one of the flanges of the side bar between said hooked member and wedge member, and means for clamping said members in position.

4. In an automobile bumper attaching device for securing the bumper to the flanged side bars of an automobile, a plurality of clamps, each comprising a member having clamping engagement with the inner side of one of the flanges and a coöperating member having clamping engagement with the outer side of this flange, said members having wedging engagement with each other.

5. In an automobile bumper attaching device for securing the bumper to the flanged side bars of an automobile, a plurality of clamps, each comprising a member having clamping engagement with the inner side of one of the flanges and the inner side of the web portion of the side bar, and a coöperating member having clamping engagement with the outer side of this flange.

6. In an automobile bumper attaching device for securing the bumper to the flanged side bars of an automobile, a plurality of clamps, each comprising a member having clamping engagement with the inner side of one of the flanges and the inner side of the web portion of the side bar, and a coöperating member having clamping engagement with the outer side of this flange and wedging engagement with the first member.

7. In an automobile bumper attaching device for securing the bumper to the flanged side bars of an automobile, a plurality of clamps, each including a hooked member engaging the inner side of the bar and an angled member having wedging engagement with the shank of the hook member.

8. In an automobile bumper attaching device for securing the bumper to the flanged side bars, a plurality of clamps, each clamp comprising a hooked member, an angled member having wedging engagement with the hooked member for clamping engagement of both members with one of the flanges of the side bar, and means securing both of said members in position.

9. In an automobile bumper, the combination, with bumper supporting arms having flat portions abutting against the webs of the side bars of the automobile, of arm securing means, each comprising an angled member having one of its legs abutting against the outer side of one of the flanges of the side bar and its other leg abutting against a portion of the arm extending below the web, and means for clamping said member to the side bar and arm comprising a hooked member having wedging engagement with the leg of the angled member abutting the side bar and clamping engagement with the flange of the side bar adjacent said leg, and means for clamping said hooked member to the arm.

10. In an automobile bumper, the combination, with bumper supporting arms having flat portions abutting against the webs of the side bars of an automobile, of arm securing means, each comprising a pair of members and securing means therefor, one of said members abutting against the flat portion of the arm, the other member wedgingly abutting against the first member and clampingly engaging one of the flanges of the side bar.

11. In an automobile bumper, the combination, with the channel side bars thereof and bumper supporting arms, of arm securing means, each comprising a pair of clamping members and means clampingly connecting said arms and members together and to the side bar, the web of the side bar being clamped between a portion of the arm and one of said members, the adjacent flange of the side bar being clamped between said clamping members by wedging contact between them.

12. In an automobile bumper, the combination, with the channel side bars thereof and bumper supporting arms, of arm securing means, each comprising a hooked member, a wedge member and means clampingly connecting said arms and members together and to the side bar, the web of the side bar being clamped between a portion of the arm and the end of the hook, the adjacent flange of the side bar being clamped between the end of the hook and the wedge member which is held in clamped position by the shank of the hooked member.

13. In an automobile bumper, the combination, with the channel side bars thereof and bumper supporting arms having flat portions abutting the webs of the side bars, of arm securing means, each comprising a hooked member, an L-shaped member and means clampingly connecting said arms and members together and to the side bar, one leg of said angled member extending in line with the web and abutting against the arm, the other leg of the angled member being wedged between the shank portion of the hook and one of the flanges of the side bar simultaneously with the clamping of the hook against said flange and the web portion of the side bar.

14. In an automobile bumper, the combination with bumper supporting arms, of arm securing means comprising a plurality of clamps, each clamp comprising a hooked member, an angled member having wedging engagement with the hooked member for clamping engagement of both members with one of the flanges of the side bar and for clamping engagement of the arm and the hooked member with the web portion of the side bar, and means securing said members and arms in clamped position.

In testimony whereof, I affix my signature, in presence of two witnesses.

RAYMOND J. TRAUPMANN.

Witnesses:
W. G. GEGNER,
D. ETZEL.